Figure 1:
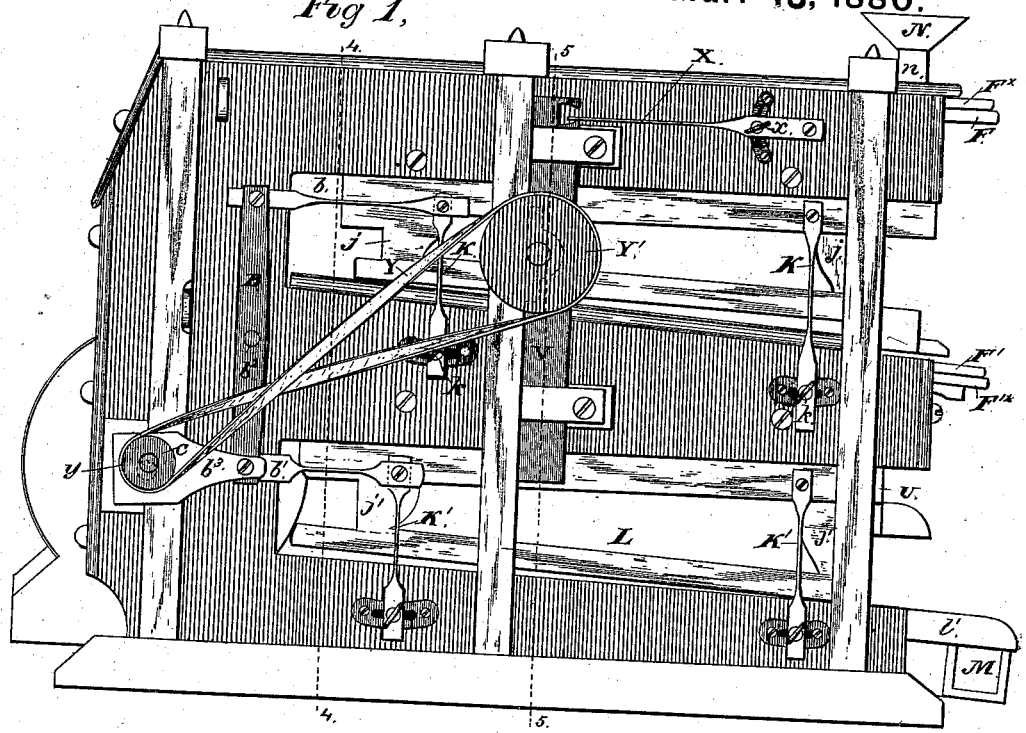

J. M. CASE & C. STEIN.
Middlings Purifier.

No. 225,564. Patented Mar. 16, 1880.

Attest:
Geo. T. Smallwood Jr.
Walter Allen

Inventors:
John M. Case.
Clinton Stein.
By Knight Bros.
Attys.

3 Sheets—Sheet 2.
J. M. CASE & C. STEIN.
Middlings Purifier.
No. 225,564. Patented Mar. 16, 1880.
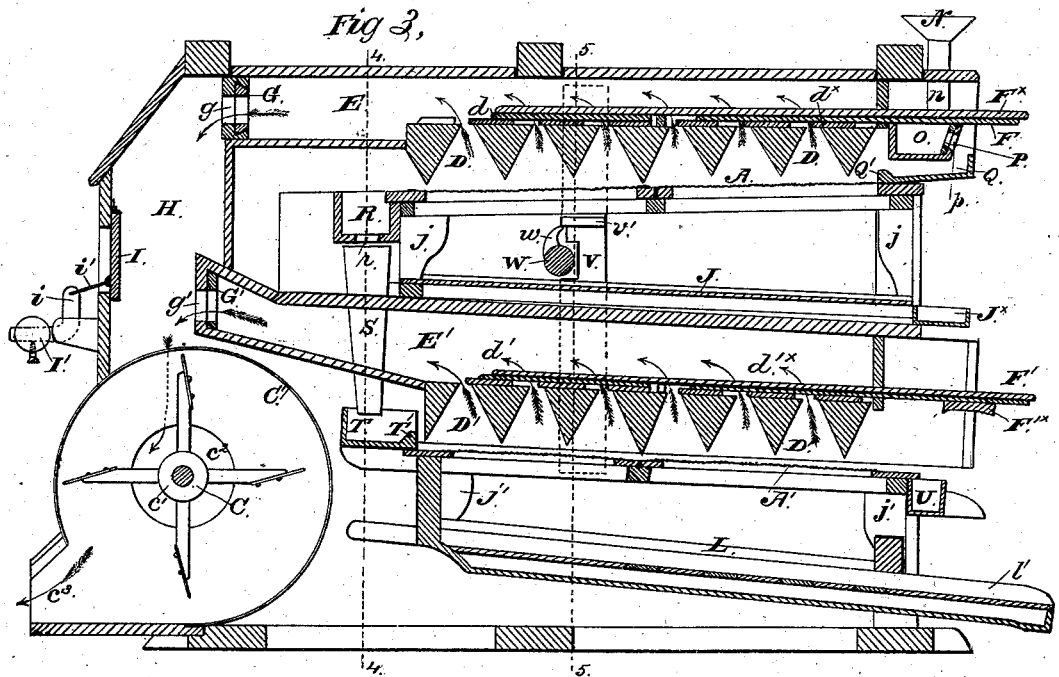
Attest
Geo. T. Smallwood Jr.
Walter Allen
Inventors:
John M. Case
Clinton Stein
By Knight Bros. attys 3 Sheets—Sheet 3.
J. M. CASE & C. STEIN.
Middlings Purifier.
No. 225,564. Patented Mar. 16, 1880.
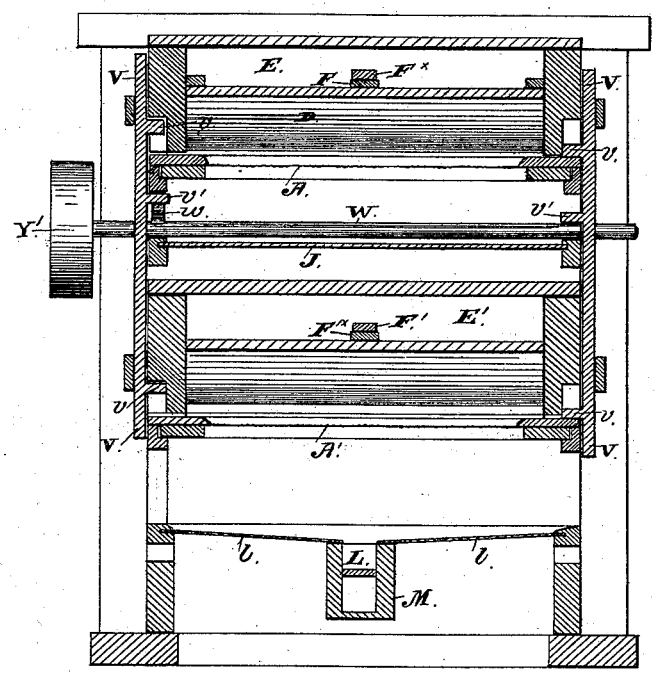
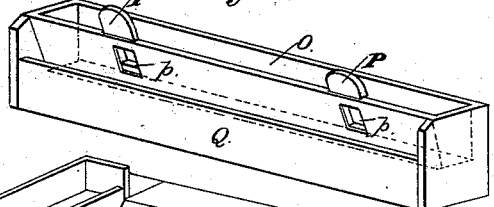
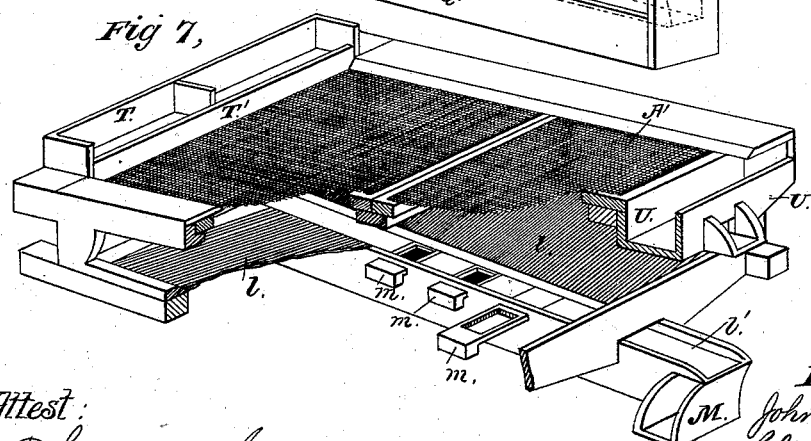

UNITED STATES PATENT OFFICE.

JOHN M. CASE AND CLINTON STEIN, OF COLUMBUS, OHIO; SAID STEIN ASSIGNOR TO SAID CASE.

MIDDLINGS-PURIFIER.

SPECIFICATION forming part of Letters Patent No. 225,564, dated March 16, 1880.

Application filed September 13, 1879.

*To all whom it may concern:*

Be it known that we, JOHN M. CASE and CLINTON STEIN, of Columbus, in the county of Franklin and State of Ohio, have invented a new and useful Improvement in Middlings-Purifiers, of which the following is a specification.

The subject of our invention is a duplex machine by which the middlings are passed over a screen, and then conducted through vertical spouts to a second screen, where they are subjected to a second operation without loss of space. A current of air produced by a suction-fan is applied to both the screens through the medium of suction-boxes over each screen, increasing in capacity backward, and divided into any desirable number of sections or compartments converging upward, so that matter raised from the surface of the screen will be subjected to a gradually-increasing current of air as it rises. The several compartments of the suction-box are provided with independent valves, so that variable degrees of suction can be applied to the different parts of the screen.

To regulate the force of the current we employ an adjustable weighted inlet-valve in the suction-throat near the fan, so that any excessive strength of suction can be prevented by the admission of air from the outside.

To jar the screens, we employ knockers operated by cams and springs, the latter being adjusted so as to graduate the strength of the stroke, or, when desired, to elevate the knocker out of action.

The middlings purified by the first screen are conducted off by a conveyer-board out of reach of the air, and exposed at the sides, so that the cleansed matter passing through the screen may be examined freely at all times. Under the second screen is a conveyer-board of peculiar construction, exposed to view like the first, and shelving from each side toward a central longitudinal channel, beneath which is a conducting-spout connected with said channel by a number of valves arranged at intervals, so that the middlings passing through any proper length of the first portion of the screen can be conducted off through a conveyer-spout as pure middlings, while the other portion, falling in the open channel, is conducted to the returns for re-treatment.

The feed is effected by a hopper or feed-box of peculiar construction having two or more valves, which deliver the material to as many sections of a divided feed-trough. In order to equalize the delivery from this feed-trough it flows over bridges to a distributing-board, which delivers it in an even uniform sheet or film to the screen.

In order that our invention may be fully understood, we will proceed to describe it with reference to the accompanying drawings, in which—

Figure 2:
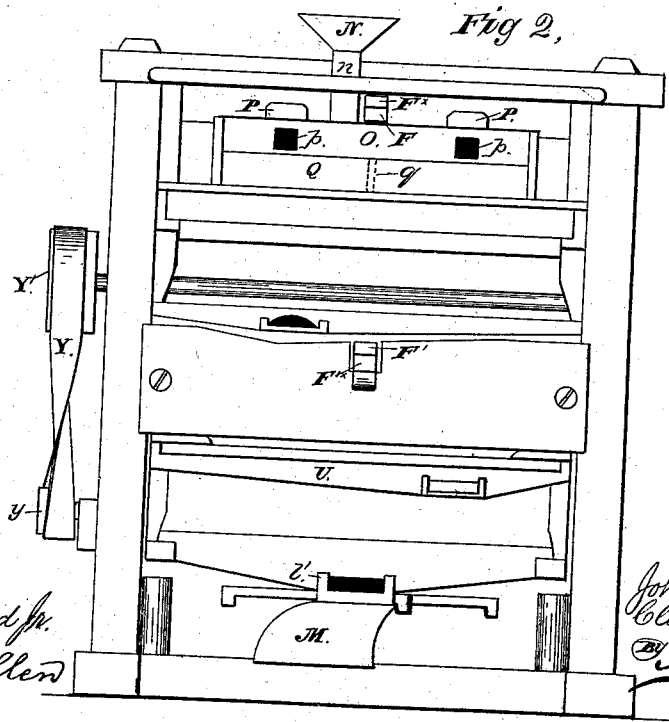

Figure 1 is a side view of a machine illustrating the invention. Fig. 2 is a front view of the same. Fig. 3 is a longitudinal section thereof. Fig. 4 is a transverse section on the line 4 4, Figs. 1 and 3. Fig. 5 is a transverse section on the line 5 5, Figs. 1 and 3. Fig. 6 is a perspective view of the feeding-trough, hereinafter described. Fig. 7 is a perspective view of the lower shoe partly broken away.

A A' represent screens, to which a longitudinal reciprocating movement is imparted by connecting-rods $b$ $b'$, attached to the ends of a reciprocating lever, B, fulcrumed at $b^2$, and connected by a rod or pitman, $b^3$, with a crank-wrist, $c$, on the shaft $c'$ of the fan C. The fan C works in a casing, C', with the customary apertures $c^2$ in its ends, and discharges in a tangential direction at $c^3$. Above each of the screens are a series of upwardly-converging air-passages, D D', connecting with suction-boxes E E', and controlled by independent valves $d$ $d^\times$ and $d'$ $d'^\times$. These valves may be divided into any desirable number of sections, so as to permit of independent graduation of the outlets of the passages D D'.

In the illustration we have shown above each screen two series of connected graduating-valves controlled by rods F F$^\times$ F' F'$^\times$, so that the first three, for example, of the passages D or D' may have one graduation and the remainder another graduation.

In practice the valves above each screen may be connected in three or more sections, so as to afford several degrees of suction over the successive portions of the surface of each screen. The air from the suction-boxes E and E' passes through openings $g\,g'$, guarded by valves G G', into a trunk, H, common to both suction-boxes, communicating with the apertures $c^2$ in the end of the fan-case C'.

In order to automatically regulate the suction in the trunk H, and consequently in the suction-boxes E E', we employ a valve, I, opening inward and controlled by a weight, I', mounted adjustably on the horizontal arm of a bell-crank lever, $i$, the vertical arm of which is connected by a rod or cord, $i'$, with the valve I, so that any excessive strength of suction or partial vacuum within the trunk H is prevented by atmospheric pressure opening the valve I. The screen A inclines from the front of the machine toward the rear or fan end, and is connected by rigid posts $j$ with a conveyer-board, J, inclining from the rear to the front, and delivering the purified middlings which pass through the screen into a trough or spout, $J^\times$, from which they are taken for use.

The structure $A\,j\,J\,J^\times$ constitutes a connected shoe supported by rocker-springs K K, which are attached adjustably to the frame of the machine by screws $k$, permitting their horizontal adjustment in order to vary the inclination of the screen, and thus regulate the flow of the middlings over it by the longitudinal and vertical motion imparted by the connecting and supporting springs $b$ K K. In like manner the lower screen, A', is rigidly connected by posts $j'$ to its conveyer L, so that said screen and conveyer, being supported by adjustable spring-standards K', will be shaken by the connecting-rods $b'$. The frame of the mill is left entirely open at each side opposite the open spaces between the respective screens A A' and the conveyers J L beneath them, so that the purified middlings passing through the screens to the said conveyers may be inspected at any and all times without arresting the operation of the machine.

The conveyer L consists of two boards or sheets of impervious cloth or other suitable material, $l\,l$, which, while partaking of the general inclination of the conveyer from the back to the front of the machine, are both inclined toward the longitudinal center, so as to deliver the middlings passing through the screen A to a longitudinal trough, $l'$, beneath which is a longitudinal spout, M, connected with the said trough at any desired intervals by sliding valves $m$ in the floor of the trough.

By this arrangement it will be apparent that the purified matter passing through the screen A', which inclines from the back to the front of the machine, may be separated into grades as found needful. That which passes through any desired length of the upper or first part of the screen is dropped into the spout M by the sliding in or opening of any one of the valves $m$, while all which passes through the remaining rear portion of the screen, and consequently enters the trough $l'$ below or in front of the open valve $m$, will be conveyed to a different place by the said open trough $l'$ and delivered into the "returns."

The feeding-hopper is shown at N. From this the middlings descend through a vertical spout, $n$, into a transverse trough, O, in the front wall of which are openings $p$, guarded by valves P, the raising or lowering of which provides a bridge of greater or less height in front of the trough O, over which bridge the middlings flow and fall into a trough, Q, which is divided in two or more parts or sections by a partition, $q$, and terminates rearwardly in a bridge, Q', over which the middlings flow in a regular and uniform film, spreading continuously over the entire breadth of the screen A.

To maintain the regularity of this feed and prevent any excess of feed on one or the other side of the machine, the two valves are adjusted up or down, as required, so that when the material is found to be feeding too fast on one side of the machine the elevation of the bridge formed by the valve P on that side will check the feed and make it equal to the other side.

Matter passing over the screen A drops from the rear or lower end thereof into a transverse trough, R, the floor of which slants to two or more openings, $r$, above vertical spouts S S, delivering into a divided trough, T T, from which the material passes over a bridge, T', to the second screen, A'. The refuse matter passing over the lower end of the screen A', which is at the front of the machine, is delivered by a trough, U, into the bran-spout, and the returns discharged by the lower portion of the central open trough, $l'$, as already described, may be carried back for re-treatment, or, if too poor for this purpose, may also be conveyed to the bran-spout.

For jarring the screens we employ knockers V, constructed with striking-lugs $v$ and with lifting-lugs $v'$, acted on by cams $w$ on the shaft W. The said knockers are thrown down by springs X, which are attached to the sides of the frame adjustably by means of set-screws $x$, so that by setting the springs up or down the strength of the blow delivered by the knockers may be regulated as desired; or, by setting the springs up to the full height, the knockers will be lifted above the reach of the cams $w$, and so prevented from striking.

The shaft W is driven by a belt, Y, running over a pulley, $y$, on the fan-shaft, and to a pulley, Y', on the shaft W, or by any other preferred means.

Having thus described our invention, the following is what we claim as new therein and desire to secure by Letters Patent:

1. A middlings-purifier constructed with two sections, one above the other, each section having a screen, a suction-box, and a set of air-valves, and with a suitable conductor for delivering the tailings from the upper screen to the head of the lower screen, as explained.

2. The combination of the oppositely-inclined screens A A', independent air-chambers E E', air-valves d d', and conducting-spout, substantially as and for the purposes set forth.

3. A middlings-purifier constructed with two independent screens, each having a closed suction-box above it and an exposed conducting-board beneath it, and with one or more conducting-tubes for delivering the tailings of the upper screen to the head of the lower one, as explained.

4. A middlings-purifier constructed with independent screens, a series of upwardly-converging air-passages over each screen communicating with a common suction-box, and with sliding valves connected in sets independently adjustable transversely to the length of the air-ports, so as to vary the strength of the suction over different parts of the screen.

5. The combination of a screen, a suction-box, and a series of upwardly-converging air-passages between them, separated by V-shaped partitions of unequal vertical width, the wider ones serving to divide the said passages into two or more sets provided with independent valves, so as to permit unequal graduation of the suction over different parts of the screen, as explained.

6. The combination, with the shaking screens, of the sliding bar V, provided with knockers v, and the adjustable springs X, for regulating their stroke, as explained.

7. The combination, with the trough Q, of the agitated trough O, provided with two or more independently-adjustable openings.

8. The combination of the screens A A', inclined in opposite directions, the exposed conducting-boards K L, inclined both in one direction, the closed suction-boxes D D', and the conducting-tubes S, whereby matter passing over the first screen is delivered directly to the second, and matter passing through both screens is carried off in one direction, as explained.

JOHN M. CASE.
CLINTON STEIN.

Witnesses:
A. L. KEISTER,
C. H. GRUEBLER.